July 2, 1929.                H. L. YOUNG                 1,719,206
                          SPLICING APPARATUS
                         Filed Aug. 4, 1928        3 Sheets-Sheet 1
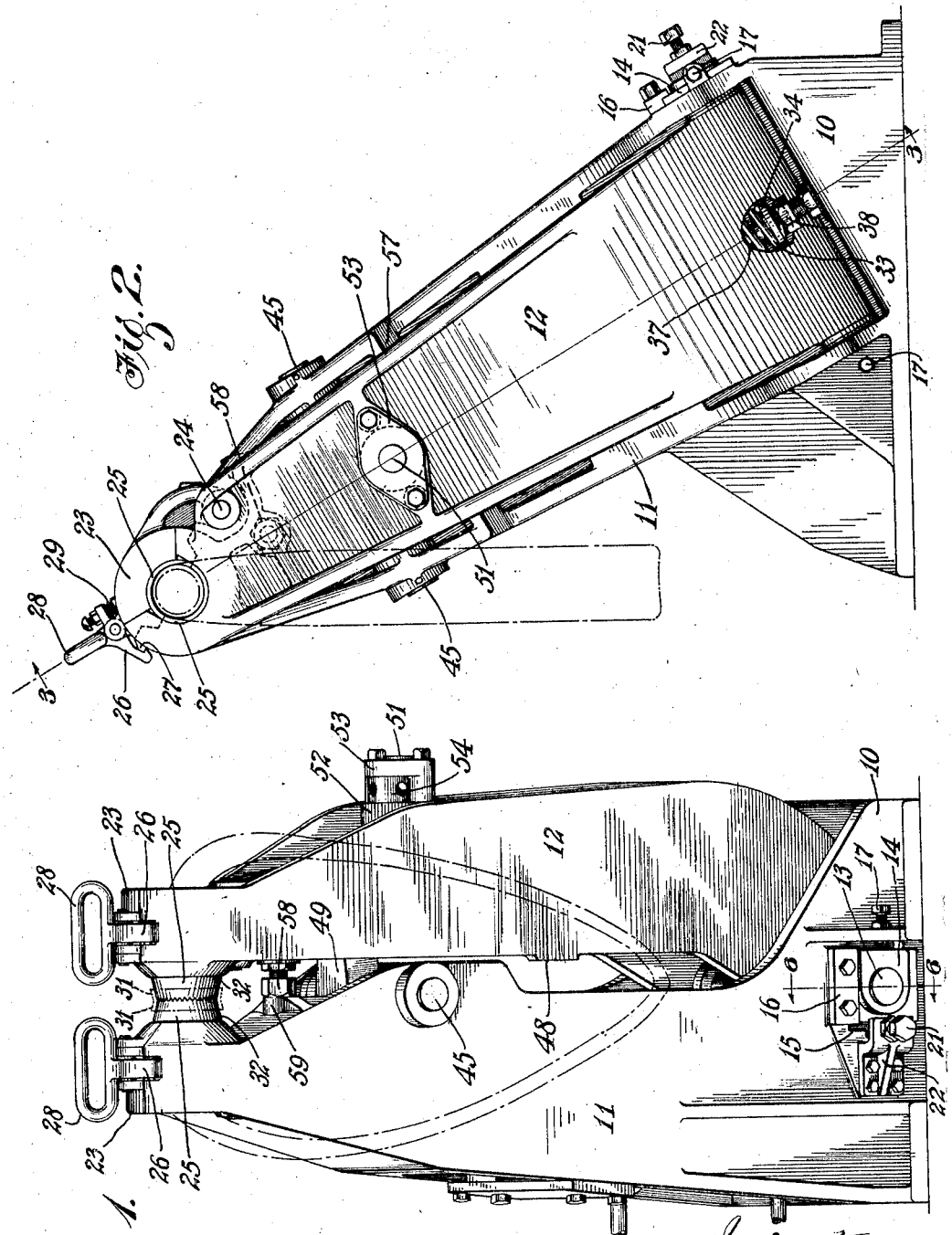
Inventor
Harvey L. Young
By Eakin & Avery Attys.

Inventor
Harvey L. Young
By Eakin & Avery
Attys.

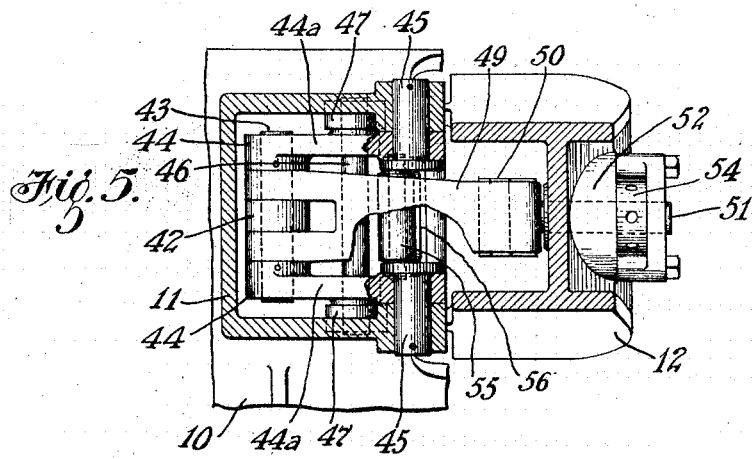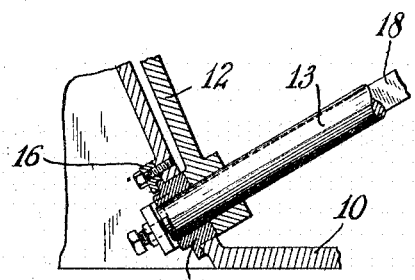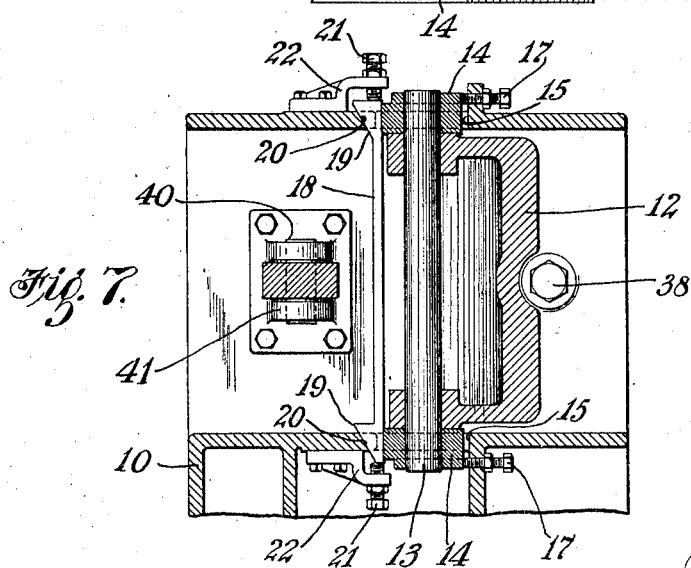

Patented July 2, 1929.

1,719,206

UNITED STATES PATENT OFFICE.

HARVEY L. YOUNG, OF AKRON, OHIO, ASSIGNOR TO THE B. F. GOODRICH COMPANY, OF NEW YORK, N. Y., A CORPORATION OF NEW YORK.

SPLICING APPARATUS.

Application filed August 4, 1928. Serial No. 297,579.

This invention relates to splicing apparatus and especially to apparatus for splicing together the respective ends of a straight or curved length of unvulcanized rubber tubing to provide an endless tube such as an inner tube for pneumatic tires.

The chief objects of the invention are to provide a splicing apparatus having its work-holding parts readily accessible to the operator; to provide positive safety features for the protection of the operator; and to provide for supporting the work in such a position as not to interfere with the operation of moving parts.

Of the accompanying drawings:

Fig. 1 is a front elevation of apparatus embodying my invention in its preferred form, as it appears in its closed or operative position.

Fig. 2 is a side elevation of the apparatus as viewed from the right of Fig. 1.

Fig. 5 is a section on line 5—5 of Fig. 3.

Fig. 6 is a section on line 6—6 of Fig. 1.

Fig. 7 is a section on line 7—7 of Fig. 3.

Figure 3:
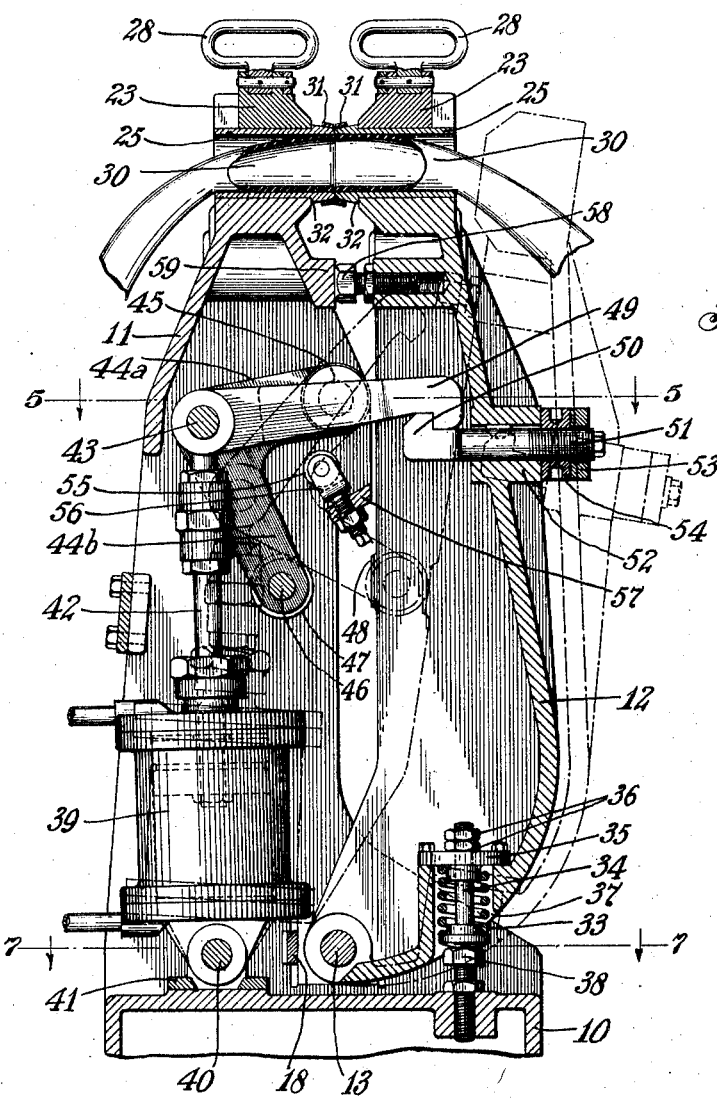
Fig. 3 is a section on line 3—3 of Fig. 2.

Referring to the drawings, 10 is a base-casting and rising upwardly therefrom is an integral arm 11 which is inclined toward the position occupied by the operator. A movable arm 12, a mate for the arm 11, is mounted upon a shaft 13 journaled in bearing blocks 14, 14 which are slidably mounted for horizontal movement in respective slots 15, 15 formed in the base-casting 10 at opposite sides thereof, keeper-members 16, 16 being provided for holding the respective bearing blocks within the slots. Set screws 17, 17 threaded through outstanding portions of the base-casting 10 and bearing against the ends of the respective bearing blocks 14 are provided for moving the latter in one direction. For positioning the bearing blocks, and for moving them in the opposite direction, in unison so as not to alter the angularity of the shaft 13, I provide an adjustment bar 18 which has one of its sides in contact with the adjacent ends of the bearing blocks 14, and its opposite side formed with oblique cam faces 19, 19 which are seated in complementally-shaped cam grooves 20, 20 formed in the end walls of the slots 15. Set screws 21, 21 are threaded through respective brackets 22, 22 mounted on the outside wall of the base-casting 10, and bear against the opposite ends of the adjustment bar 18 for moving it longitudinally and thereby moving the bearing blocks 14 horizontally in their slots, upon occasion, when such readjustment of the shaft 13 is necessary to reposition the arm 12 with relation to the arm 11, to effect the accurate registry of a pair of splicing sleeves mounted in the ends of the arms 11, 12, as presently will be described.

Each of the arms 11, 12 has its upper end formed with a semi-cylindrical socket or recess and is provided with a cap or closure member 23, hinged to the arm at 24, formed with a complemental semi-cylindrical socket or recess. Mounted in said sockets are the respective halves of a sectional splicing sleeve 25. The closure member 23 is provided with a hinged latch 26 adapted to take over an outstanding lug 27 (Fig. 2) formed on the arm, said latch being formed with a handle 28 for its manual manipulation and provided with a compression spring 29 so mounted and arranged as to urge the latch normally toward latching position.

The splicing sleeves 25 project from the adjacent sides of their mountings, to permit the ends 30, 30 of a tube which is to be spliced to be cuffed back over them, the cuffed-back portions, designated 31, 31, being trimmed off in the splicing operation. Each sleeve section preferably is formed with a shoulder 32 abutting its mounting to withstand the force with which the sleeves are brought together. The adjacent ends of the splicing sleeves are formed with respective cutting edges, which preferably are complementally serrated, as in splicing devices heretofore known, to give a zig-zag seam, which has been found to be desirable for strength, the said edges being adapted to move into interfitted relation to each other to join the tube ends in an annular seam and to shear off the cuffed-back excess portions of the stock when the arm 12 is moved toward the arm 11 to bring the sleeves into cutting relation.

Figure 4:
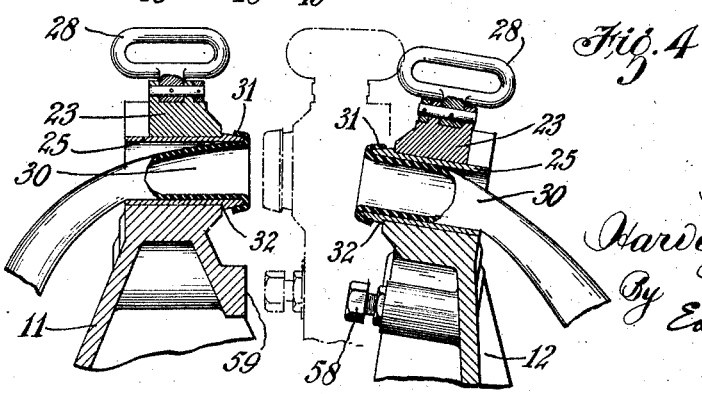
Fig. 4 is a fragmentary sectional view of the splicing jaws in their opened or inoperative position.

The inoperative, work-receiving position of the apparatus is indicated by the broken lines of Fig. 3 and the full lines of Fig. 4, the arm 12 being forcibly held in opened position away from the arm 11 against a compression spring 33 which spring initiates the closing movement of the arm when the opening force is removed.

The spring 33 is mounted upon a round head bolt 34 and bars against the head of said bolt and against an apertured plate 35 in which said bolt is slidably mounted, retaining nuts 36, 36 being threaded onto the end of said bolt for adjusting the compression of the spring 33, and for limiting the movement of the bolt 34. The plate 35 is secured to the inner wall of the arm 12 and the bolt 34 extends outwardly through an aperture 37 in said wall. The round head of the bolt 34 bears against the head of a vertically-adjustable bolt 38 threaded through the base-casting 10, the length of the bolts 34, 38 determining the limit of the closing movement of the arm 11 under the impetus of the spring 33, which limit is indicated by the broken-line position of said arm in Fig. 4.

For rocking the arm 12 on the pivot 13 in the closing and opening movements of an operative cycle, a double-acting fluid-pressure cylinder 39 is pivotally mounted at 40 in a journal bracket 41 mounted on the base-casting 10, said cylinder having an upwardly extending, variable-length piston rod 42 which engages at its outer end a wrist-pin 43 connecting the elbows or angle portions of spaced apart bell cranks 44, 44. The latter comprise respective approximately-horizontal arms 44ª, 44ª which are pivoted at their ends upon stub shafts 45, 45 mounted in the front and rear walls of the arm 11, and downwardly-extending arms 44ᵇ, 44ᵇ which have their free ends formed as journals for a shaft 46 upon the end portions of which are mounted respective cam rollers 47, 47 which are adapted to engage respective bosses 48, 48 formed on the arm 12 for forcing the arm 12 away from the arm 11.

Mounted upon the wrist pin 43 is a latch 49 which extends toward the arm 12 and is adapted to engage a hook 50 carried thereby. The hook 50 is formed with a threaded stem 51 which is keyed in a bore which extends through the side wall of the arm 12, a boss 52 formed thereon, and a yoke 53 mounted upon said boss. A nut 54 is threaded on the stem 51 between the boss 52 and yoke 53, the arrangement being such that rotation of the nut moves the stem 51 axially in its bore, thereby altering the position of the hook 50 with relation to the latch 49 and providing means for adjusting the pressure applied upon the work to effect the shearing and splicing thereof.

A roller 55 is journaled in a fork 56 which has a threaded stem adjustably mounted in a web 57 connecting the front and rear walls of the arm 11, said roller serving as a fulcrum for the latch 49 to cause the hook end of the latter to rise out of engagement with the hook 50 when the other end of the latch is depressed by the downward movement of the piston rod 42.

A threaded bolt 58 is mounted in the arm 12 and adapted to engage a boss 59 formed on the arm 11 near the upper end thereof to provide a positive stop to prevent excessive movement of the arm 12 which might break the splicing sleeves by forcing them too strongly together.

In the operation of the apparatus, the upper end of the cylinder 39 is first charged, which causes the parts to occupy the open positions indicated by the broken lines of Fig. 3 and the full lines of Fig. 4. This permits the operator to pass the end portions 30, 30 of a tube to be spliced through the sleeves 25 and to cuff them back over the projecting portions of the sleeves as shown. The upper end of the cylinder 39 is then exhausted and the lower end charged, which causes the piston rod 42 to rise and, in its initial movement to retract the rollers 47 from the arm 12, the spring 33 then causing the latter to swing toward the arm 11 to the position indicated by the broken lines of Fig. 4. Continued upward movement of the piston rod 42, by raising the rear end of the latch 49, first causes the forward end thereof to move into engagement with the hook 50 and then causes the hook to move rearwardly, with an over-center toggle action in relation to the stub shafts 45, to draw the arm 12 forcibly toward the arm 11 and bring the cutting edges of the sleeves 25 into cooperative cutting relation. The result is the severing of the cuffed-back portions 31 and the joining of the tube ends in a strong splice. The several portions 31 are then removed, the cylinder 39 reversed to restore the apparatus to its inoperative position, and the closure members 23 opened and the tube removed, the tube having been made endless by the splicing operation. The operations as described may then be repeated.

In the operation as described the first movement of the operative cycle brings the apparatus to the broken line position of Fig. 4 wherein the cutting edges of the sleeves 25 are spaced about ⅜ of an inch apart, and the hook 50 is so positioned with relation to the latch 49 that the later will just engage it when the sleeves are so positioned. The arrangement is such that when the sleeves are farther apart than ⅜ inch, as would be the case if the operator's hand or a finger were caught between the cutting edges of the sleeves, the latch 49 will not operatively engage the hook 50 and the cutting edges of the sleeves 25 will not be brought together by the completion of the upward movement of the piston rod 42.

The inclined position of the arms is such that they support the sleeves in an overhanging position, which permits the operator to work while standing in an erect position and closely to approach the operative parts of the machine. It also permits the work to be suspended clear of moving parts, as shown in Fig. 2, so as not to become entangled therein or to be fouled with oil or grease.

The hinged relation of the splicing sleeves reduces friction as compared with a device having one of the sleeves slidably mounted for movement into and out of association with the other and the hinged relation also provides conveniently for the inclusion of other features of construction described. The provision of the adjustment means in the hinge connection between the two arms provides conveniently for aligning the axes of the sleeves so that their splicing and cutting edges meet properly throughout the circumference of the tube as distinguished from being stopped by contact with each other at only the outer or the inner part of the circumference.

My invention may be variously modified and I do not wholly limit my claims to the specific construction shown and described.

I claim:

1. Splicing apparatus comprising a pair of splicing sleeves, respective mountings for the same, one of the mountings being hinged for movement toward and from the other to present and retract the sleeve carried thereby with relation to the other sleeve, and adjustment means for varying the path of travel of the sleeve that is so moved and thereby obtaining alignment of the sleeves.

2. Apparatus as defined in claim 1 in which the adjustment means is interposed in the hinge connection between the two mountings.

3. Splicing apparatus comprising a pair of splicing sleeves, respective supports therefor, one of said supports being mounted for movement toward and from the other for presenting and retracting one of the sleeves with relation to the other, yielding means for initiating the movement of the sleeves toward each other, and positive means for further forcing them into cooperative relation.

4. Splicing apparatus as defined in claim 3 in which the positive means is inoperative when the sleeves are separated in excess of a determinate distance.

5. Splicing apparatus as defined in claim 3 including means for moving the supports away from each other against the force of the yielding means.

6. Splicing apparatus comprising a pair of splicing sleeves, respective arms supporting the same, one of said arms being pivotally mounted, yielding means for swinging the latter arm toward the other arm, and positive means for further forcing it into cooperative relation therewith.

7. Splicing apparatus as defined in claim 6 in which the arms are so formed and mounted as to support the sleeves in an overhanging position.

8. Splicing apparatus comprising a pair of splicing sleeves, respective arms supporting the same and movable with relation to each other, yielding means urging said arms toward each other, positive means for drawing said arms into cooperative relation, and positive means for forcing them apart against the force of said yielding means, both of said positive means being actuated by a power member common to them.

In witness whereof I have hereunto set my hand this 2nd day of August, 1928.

HARVEY L. YOUNG.